(12) United States Patent
Heaton

(10) Patent No.: US 10,843,316 B1
(45) Date of Patent: Nov. 24, 2020

(54) SUPPORT STAND

(71) Applicant: Kenneth Guy Heaton, Orange, CA (US)

(72) Inventor: Kenneth Guy Heaton, Orange, CA (US)

( * ) Notice: Subject to any disclaimer, the term of this patent is extended or adjusted under 35 U.S.C. 154(b) by 83 days.

(21) Appl. No.: 15/874,873

(22) Filed: Jan. 18, 2018

Related U.S. Application Data

(63) Continuation-in-part of application No. 15/725,272, filed on Oct. 4, 2017, now Pat. No. 10,286,569, which is a continuation-in-part of application No. 14/121,460, filed on Sep. 9, 2014, now abandoned, which is a continuation-in-part of application No. 12/925,965, filed on Nov. 3, 2010, now Pat. No. 8,858,135, which is a continuation of application No. 12/069,047, filed on Feb. 7, 2008, now Pat. No. 7,921,532.

(51) Int. Cl.
*B23C 1/20* (2006.01)
*B25B 27/20* (2006.01)

(52) U.S. Cl.
CPC ............. *B25B 27/20* (2013.01); *B23C 1/20* (2013.01); *Y10T 409/30644* (2015.01)

(58) Field of Classification Search
CPC .......... F16B 39/32; F16B 39/00; B25B 27/20; B25B 27/14; B25B 27/06; B25B 13/48; B23C 1/20; B26D 3/163; Y10T 409/30644; Y10T 409/306384; Y10T 409/307616; Y10T 82/16639; Y10T 82/16951; Y10T 82/22; Y10T 82/2522; Y10T 82/12
See application file for complete search history.

(56) References Cited

U.S. PATENT DOCUMENTS

| | | | | |
|---|---|---|---|---|
| 2,044,667 A | * | 6/1936 | Collins | F16B 39/32 411/328 |
| 5,177,853 A | * | 1/1993 | Herook | B25B 27/14 29/266 |
| 6,142,460 A | * | 11/2000 | Irwin | B25B 5/10 269/37 |
| 6,557,229 B1 | * | 5/2003 | Ricci | B25B 13/48 269/49 |
| 6,789,990 B1 | * | 9/2004 | Harris | F16B 39/04 411/14 |
| 7,140,086 B2 | * | 11/2006 | Heaton | E03C 1/2665 29/271 |
| 7,685,689 B1 | * | 3/2010 | Del Castello | E03C 1/2665 254/133 R |

(Continued)

*Primary Examiner* — Nicole N Ramos
(74) *Attorney, Agent, or Firm* — QuickPatents, LLC; Kevin Prince

(57) ABSTRACT

A stand for supporting a garbage disposal on a generally horizontal support surface includes threaded shaft with a platform at a top end thereof. A manually-actuable knob engages the threaded shaft to raise or lower the shaft and platform with respect to a base adapted for resting on the support surface and slidably receiving the threaded shaft therein. An alignment tool used for aligning a split retainer ring for receipt in an exterior ring groove formed around the exterior of a lower peripheral of a sink drain fitting may be included that works with the threaded rod and platform to facilitate installation of the split retainer ring on the sink drain fitting, providing dual use for the threaded shaft and platform.

10 Claims, 4 Drawing Sheets

(56) References Cited

U.S. PATENT DOCUMENTS

| | | | | |
|---|---|---|---|---|
| 7,726,631 | B2* | 6/2010 | Noe | E03C 1/266 |
| | | | | 254/100 |
| 7,918,003 | B2* | 4/2011 | Acciardo, Jr. | B25B 27/062 |
| | | | | 29/263 |
| 9,550,279 | B2* | 1/2017 | Dionne | B25B 9/00 |
| 2009/0199382 | A1* | 8/2009 | Heaton | B25B 27/20 |
| | | | | 29/270 |
| 2009/0208309 | A1* | 8/2009 | Engelbrecht | F16B 39/32 |
| | | | | 411/318 |
| 2014/0084610 | A1* | 3/2014 | Nguyen | B25B 27/02 |
| | | | | 294/19.3 |

* cited by examiner

SUPPORT STAND

CROSS-REFERENCE TO RELATED APPLICATIONS

This application is a continuation-in-part of U.S. patent application Ser. No. 15/725,272, filed on Oct. 4, 2017, which is itself a continuation-in-part of U.S. patent application Ser. No. 14/121,460, filed Sep. 9, 2014, which, in turn is a continuation-in-part of U.S. patent application Ser. No. 12/925,965, filed Nov. 3, 2010, now issued as U.S. Pat. No. 8,858,135, and the benefit of these earlier filing dates is claimed for all matter common therewith.

STATEMENT REGARDING FEDERALLY SPONSORED RESEARCH AND DEVELOPMENT

Not Applicable.

FIELD OF THE INVENTION

This invention relates to support stands, and more particularly to a support stand particularly well-suited for installing and removing a garbage disposal from a sink installation.

DISCUSSION OF RELATED ART

The process of replacement and mounting a food refuse macerator, often referred to as a garbage disposal, to the lower drain portions of a kitchen sink entails complex engagement geometries that need to be effected within the very tight and narrow confines of a sink cabinet and is therefore a difficult and cumbersome task. Simply, the disposal is usually a fairly heavy item as it typically requires a robust electrical motor tied to various gearing components, all housed in a sealed enclosure to extend a drive end engaged to the cutting mechanism into a wet cavity that communicates with the sink drain. To simplify the mounting process of this cumbersome equipment piece the sink drain fittings that are intended to support the disposal are typically provided with a lower end that includes an exterior ring groove in which a retainer ring is mounted to support a disposal mounting flange. It is this mounting flange that then includes the typical engagement projections to which the disposal is keyed.

Often during the installation or removal process, the garbage disposal is not supported by the sink drain fittings but still needs to be proximate thereto for alignment of drain pipes and the like. Often plumbers will use a standard 5-gallon bucket or 1-gallon paint can, or other handy object, none of which are well-suited for not only supporting the heavy load of a garbage disposal but positioning the garbage disposal where needed, just under the sink fittings. Further, flat platforms on which to rest the garbage disposal often result in a power cord exiting a bottom side of the garbage disposal being pinched between the garbage disposal and the platform.

Therefore, there is a need for a support stand that is lightweight, relatively compact and adapted for holding a garbage disposal unit upright and in place proximate where it will be installed. Such a needed support stand would provide an easy and quick way to raise and lower the garbage disposal into a proper position for fitting drain pipes and the like. Such a needed invention would further facilitate the installation of the retainer ring onto the sink drain fittings in a dual-use mode. The present invention accomplishes these objectives.

SUMMARY OF THE INVENTION

The present device is a stand for supporting a load, such as a garbage disposal machine, on a generally horizontal support surface, such as a cabinet floor. A threaded shaft has a platform at a top end thereof. A manually-actuable knob engages the threaded shaft to raise or lower the shaft and platform with respect to a base adapted for resting on the support surface. As such, the stand can raise or lower the load above the support surface.

Preferably the threaded shaft includes a thread with at least six or eight starts, such that one rotation of the knob on the threaded shaft moves the threaded shaft up or down by at least six threads, resulting in quicker raising or lowering of the load with each turn of the knob.

In some embodiments the base comprises a cylindrical upper base configured to receive a portion of the threaded shaft therein through an open top end of the upper base. A lower base comprises a central receiver configured for receiving a lower end of the upper base in a substantially vertical orientation, and a plurality of feet radially extending therefrom.

Further, the threaded shaft may include a notch formed in each thread at a first radial location about the threaded shaft, each notch aligned with the adjacent notches. In such an embodiment the upper base includes a tab projecting inwardly from an inside surface thereof. The tab is configured to engage at least one of the notches of the threads while the threaded shaft moves up and down within the upper base. The threaded shaft and platform thereby maintain a constant rotational position therealong with respect to the base.

The support stand may further include an alignment tool used for aligning a split retainer ring for receipt in an exterior ring groove formed around the exterior of a lower peripheral of a sink drain fitting. While the alignment tool is used, the base may be moved out of the way or left in place. The alignment tool includes a generally tubular segment defined by a peripheral wall encloses an interior opening dimensioned to radially compress the retainer ring upon the generally transverse receipt thereof within the opening. A first portion of the peripheral wall includes a plurality of spaced separations extending generally parallel to the central axis of the segment and defining a corresponding plurality of partial wall strips extending in cantilever from the remaining second portion thereof to top ends thereof. The segment is preferably made from a resilient plastic material. A support shoulder is formed in interior surfaces of each strip at the top ends thereof for opposing the axial translation of the ring within the interior opening.

A bottom plate extends across the second portion of the tubular segment at a bottom end thereof, and includes a central threaded aperture therethrough. A threaded shaft extends through the aperture of the bottom plate, through the segment, and is configured to extend into the drain fitting.

In use, with the platform fitted above the sink drain fitting and with the threaded shaft extending through the sink drain fitting and threaded onto the central threaded aperture of the bottom plate of the alignment tool, and with the split ring fixed within the opening at the top ends of the strips at the support shoulders thereof, the split ring is pressed about the lower peripheral of the sink drain fitting by rotating the alignment tool. Each strip flexes outwardly as the split ring expands around the lower peripheral of the sink drain fitting until it snaps into the ring groove of the sink drain fitting. The alignment tool is then unscrewed from the threaded shaft and, if desired, the threaded shaft and platform are re-engaged with the base to subsequently support the load.

The present invention is a support stand that is lightweight, relatively compact and adapted for holding a garbage disposal unit upright and in place proximate where it will be installed. The present support stand provides an easy and quick way to raise and lower the garbage disposal into a proper position for fitting drain pipes and the like. The present invention further facilitates the installation of the retainer ring onto the sink drain fittings in a dual-use mode. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 7:
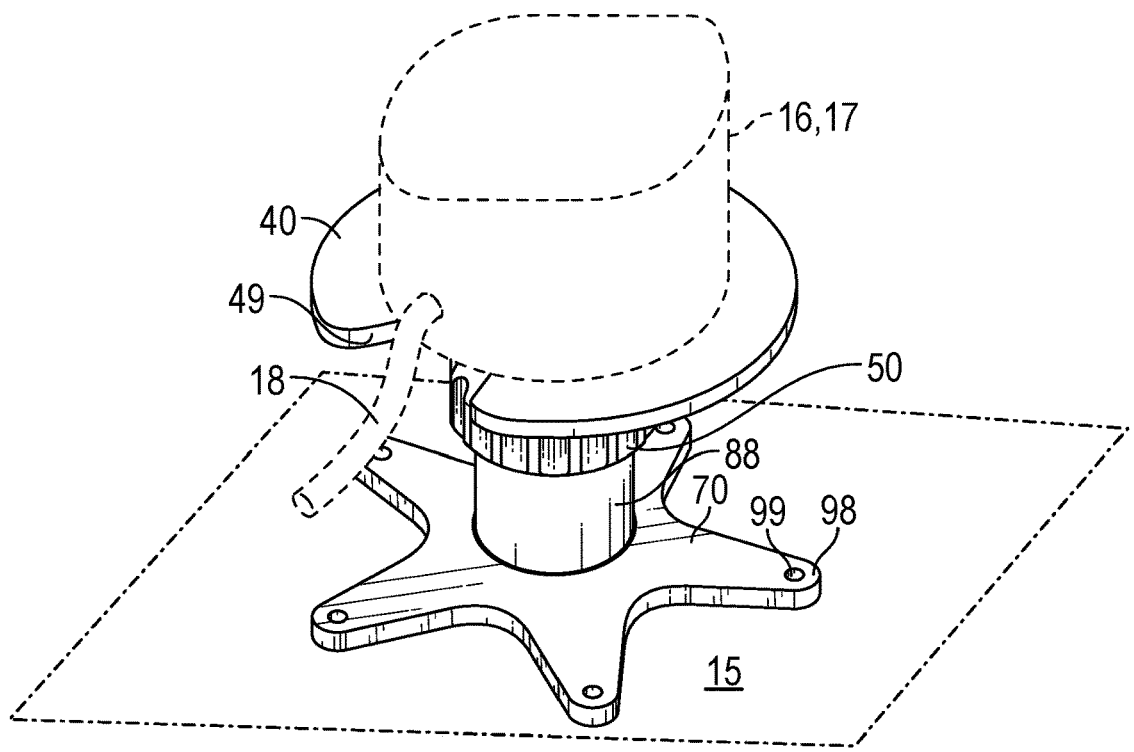
FIG. 7 is a top plan view of the embodiment of FIG. 3, shown supporting a garbage disposal on a platform thereof.

FIGS. 1-4 illustrate a stand 10 for supporting a load 16, such as a garbage disposal machine 17, on a generally horizontal support surface 15, such as a cabinet floor (FIG. 7).

A threaded shaft 30 has a platform 40 at a top end 38 thereof. Preferably the platform 40 is removably attached with the top end 38 of the threaded shaft 30 with a mechanical fastener 100, such as a threaded bolt or the like. Further, the platform 40 may include a radial cut-out 49, such that a power cord 18 of the garbage disposal machine 17 is received within the cut-out 49 and not pinched between the platform 40 and the garbage disposal machine 17 when the garbage disposal machine 17 is supported by the platform 40. The threaded shaft 30 is preferably made with a rigid plastic, wood or metal material.

A manually-actuable knob 50 engages the threaded shaft 30 to raise or lower the shaft 30 and platform 40 with respect to a base 20 adapted for resting on the support surface 15. As such, the stand can raise or lower the load 16 above the support surface 15. The knob 50 is preferably made with a rigid plastic material, but can also be made from wood or metal material.

Preferably the threaded shaft 30 includes a thread 60 with at least six or eight starts, such that one rotation of the knob 50 on the threaded shaft 30 moves the threaded shaft up or down by at least six threads 60, resulting in quicker raising or lowering of the load 16 with each turn of the knob 50.

Figure 1:
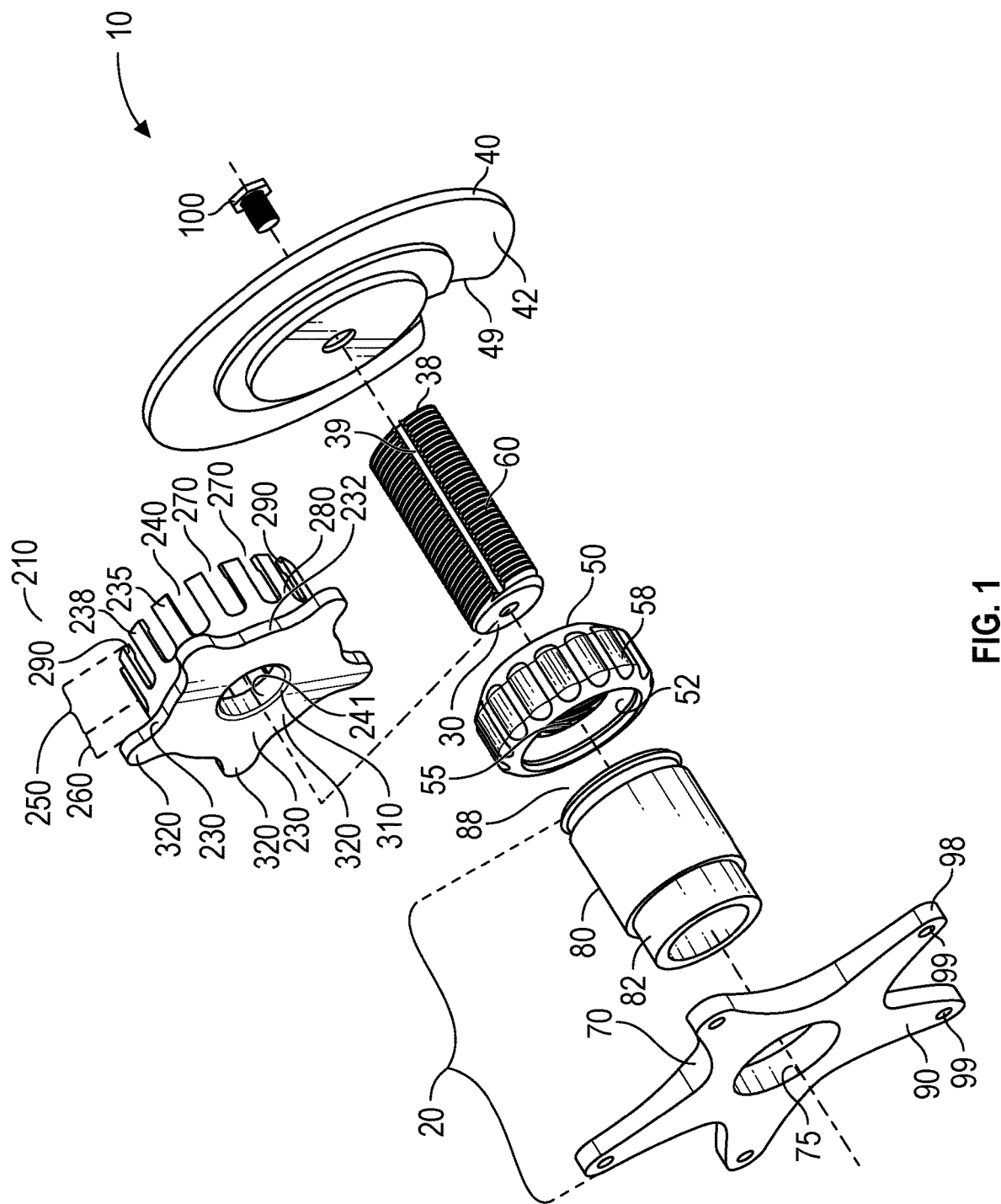
FIG. 1 is a perspective exploded view of the invention.
Figure 2:
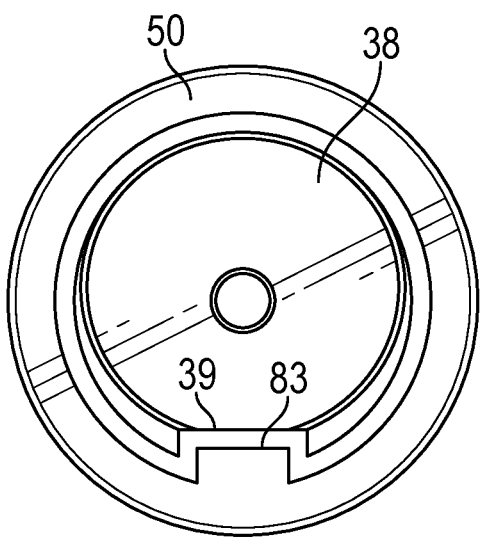
FIG. 2 is a top plan view of a threaded shaft as fitted within a base of the invention.
Figure 3:
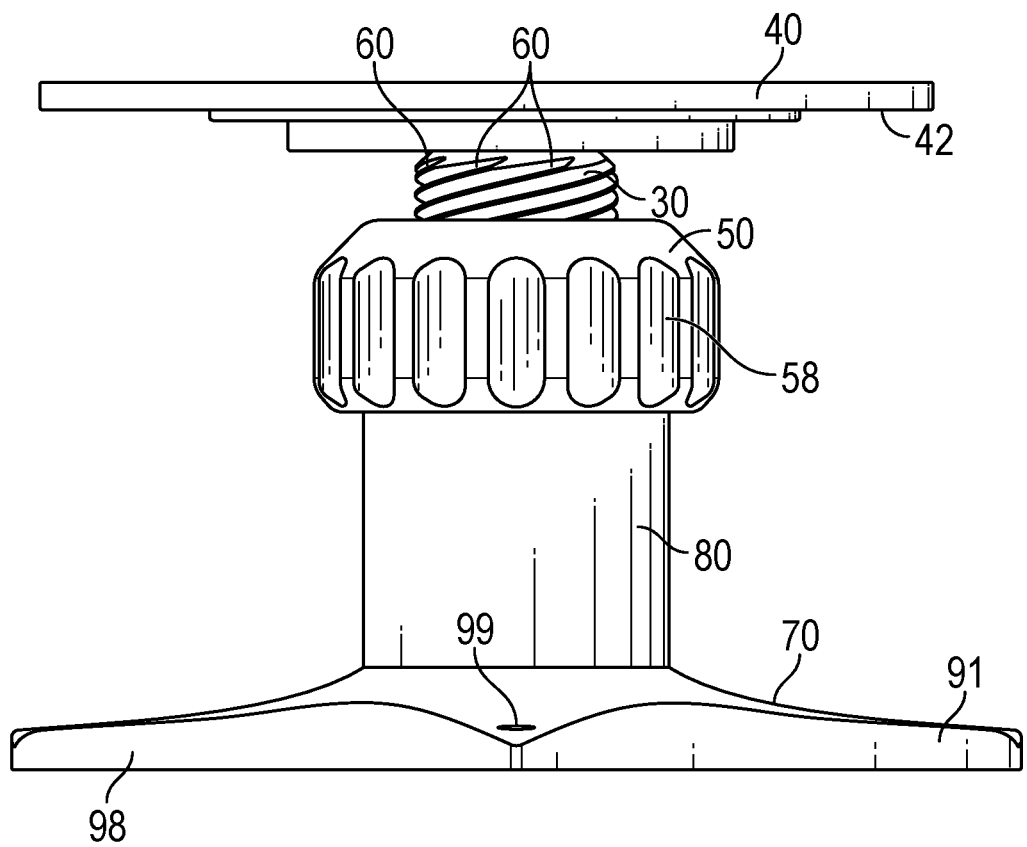
FIG. 3 is a front elevational view of one embodiment of the invention.
Figure 4:
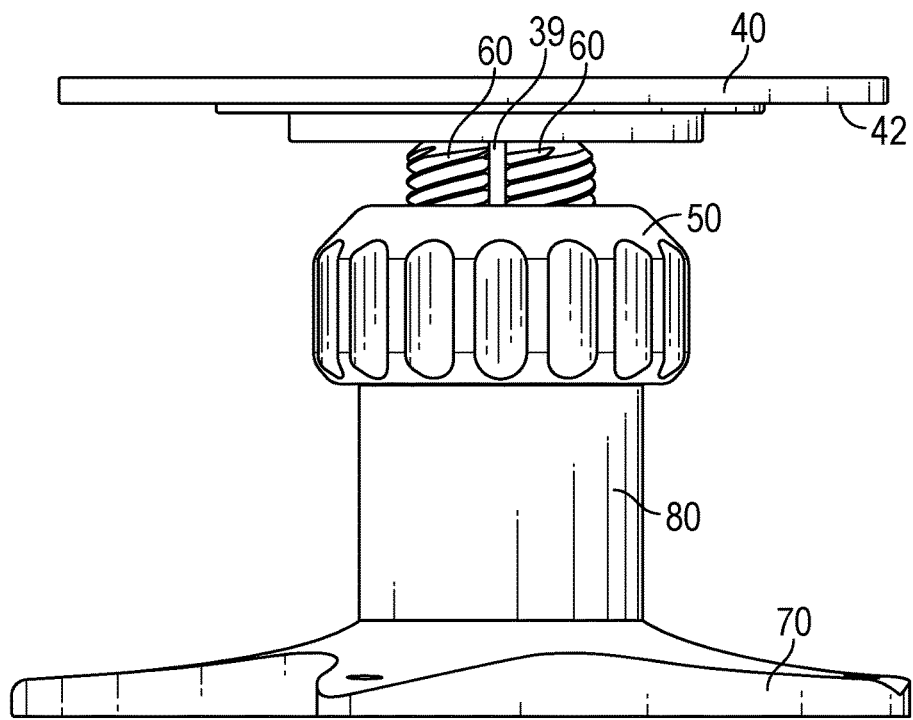
FIG. 4 is a left-side elevational view of the embodiment of FIG. 3.
Figure 5:
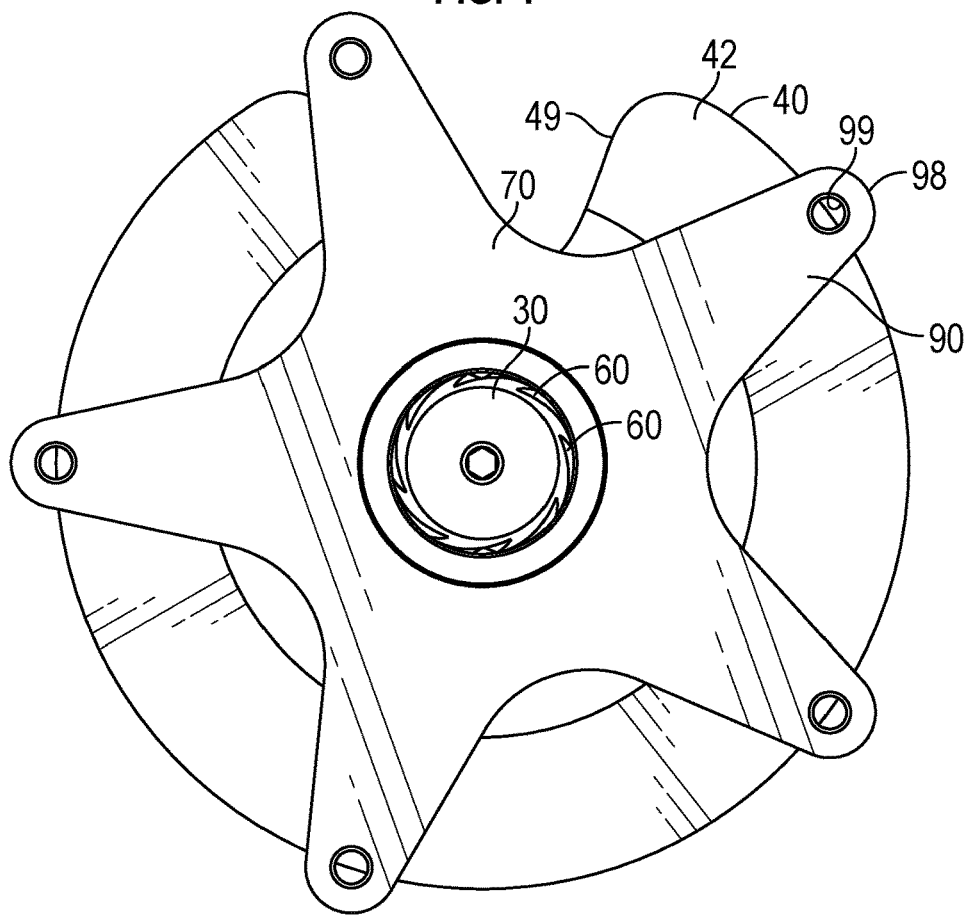
FIG. 5 is a bottom plan view of the embodiment of FIG. 3.

In some embodiments the base 20 comprises a cylindrical upper base 80 configured to receive a portion of the threaded shaft 30 therein through an open top end 88 of the upper base 80. A lower base 70 comprises a central receiver 75 configured for receiving a lower end 82 of the upper base 80 in a substantially vertical orientation, and a plurality of feet 90 (FIGS. 5 and 7) radially extending therefrom. Each foot 90 is adapted for contacting the horizontal surface 15. An end portion 98 of each foot 90 may include a marking aperture 99 so that the position of the support stand 10 on the horizontal surface 15 may be marked therethrough. As such, the support stand 10 may be replaced at the same general position on the horizontal surface 15 by aligning the marks made on the horizontal surface with the marking apertures 99.

The knob 50, in such an embodiment, preferably includes an outer surface 58 facilitating manual gripping thereof, such as a knurled surface, for example. Such a knob 50 further includes a lower collar 52 adapted to cover the open top end 88 of the upper base 80 and rotate thereon, and an inner thread 55 configured for engaging the threaded shaft 30. Further, the threaded shaft may include at least one notch 39 formed in each thread 60 at a first radial location $R_1$ about the threaded shaft 30, each notch 39 aligned with the adjacent notches 39. In such an embodiment the upper base 80 includes at least one tab 83 (FIG. 2) projecting inwardly from an inside surface 82 thereof. The tab 83 is configured to engage at least one of the notches 39 of the threads 60 while the threaded shaft 30 moves up and down within the upper base 80. The threaded shaft 30 and platform 40 thereby maintain a constant rotational position therealong with respect to the base 80. A suitable viscous lubricant material (not shown) may be applied to the threaded shaft 30 to reduce friction between the threads 60 and the inner thread 55 of the knob 50, the at least one tab 83 serving to distribute the lubricant material vertically along the at least one notch 39 as the threaded shaft 30 travels vertically within the base 80.

Figure 6:
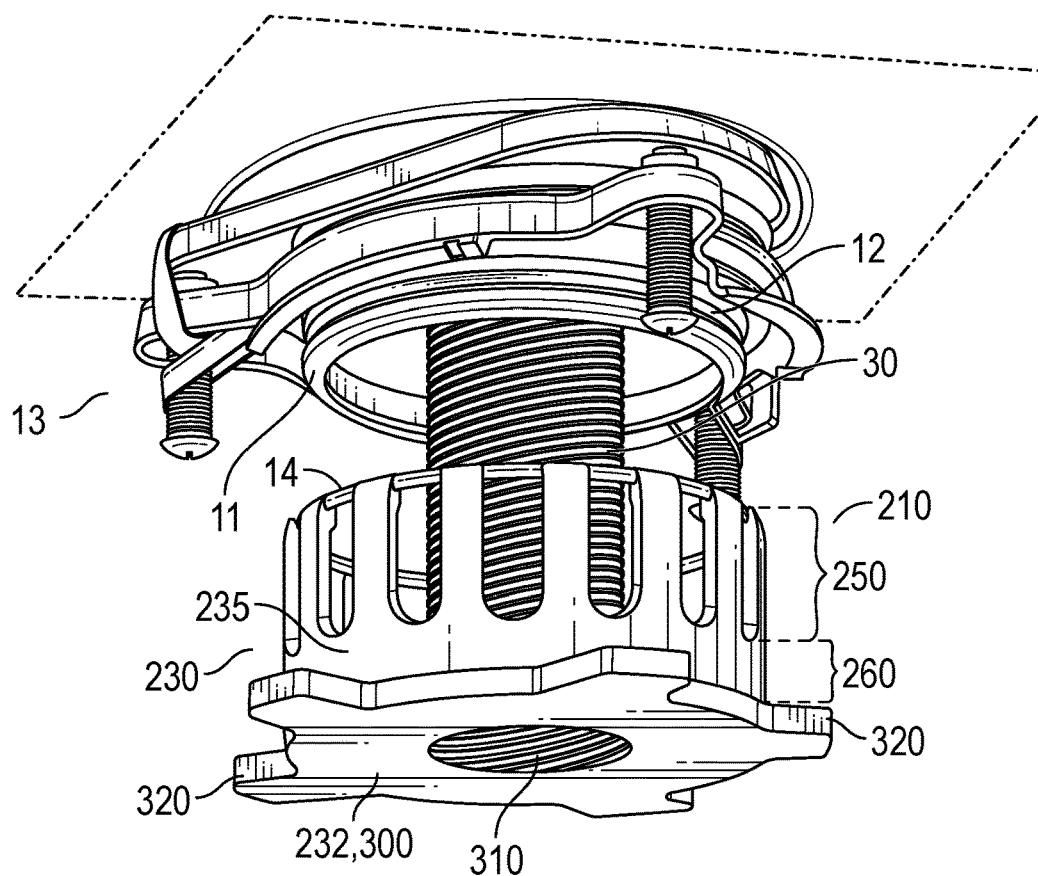
FIG. 6 is a bottom perspective view of an alternate embodiment of the invention.

The support stand 10 may further include an alignment tool 210 (FIGS. 1 and 6) used for aligning a split retainer ring 14 for receipt in an exterior ring groove 12 formed around the exterior of a lower peripheral 11 of a sink drain fitting 13. While the alignment tool 210 is used, the base 20 may be moved out of the way or left in place.

A generally tubular segment 230 defined by a peripheral wall 235 encloses an interior opening 240 dimensioned to radially compress the retainer ring 14 upon the generally transverse receipt thereof within the opening 240. A first portion 250 of the peripheral wall 235 includes a plurality of spaced separations 270 extending generally parallel to the central axis of the segment 230 and defining a corresponding plurality of partial wall strips 280 extending in cantilever from the remaining second portion 260 thereof to top ends 238 thereof. The segment 230 is preferably made from a resilient plastic material. A support shoulder 290 is formed in interior surfaces 241 of each strip 280 at the top ends 238 thereof for opposing the axial translation of the ring 14 within the interior opening 240.

A bottom plate 300 extends across the second portion 260 of the tubular segment 230 at a bottom end 232 thereof. The bottom plate 300 includes a central threaded aperture 310 therethrough. A threaded shaft 30 extends through the aperture 310 of the bottom plate 300, through the segment 230, and is configured to extend into the drain fitting 13. Preferably the alignment tool 210 includes a plurality of outwardly-projecting prongs 320 configured for facilitating a manual grip on the alignment tool 210 for threading the alignment tool 210 onto the threaded shaft 30 and rotating the alignment tool 210 on the shaft 30.

In use, with the platform 40 fitted above the sink drain fitting 13 and with the threaded shaft 30 extending through the sink drain fitting 13 and threaded onto the central threaded aperture 310 of the bottom plate 300 of the alignment tool 210, and with the split ring 14 fixed within the opening 240 at the top ends 238 of the strips 280 at the support shoulders 290 thereof, the split ring 14 is pressed about the lower peripheral 11 of the sink drain fitting 13 by rotating the alignment tool 210. Each strip 280 flexes outwardly as the split ring 14 expands around the lower peripheral 11 of the sink drain fitting 13 until it snaps into the ring groove 12 of the sink drain fitting 13. The alignment tool 210 is then unscrewed from the threaded shaft 30 and, if desired, the threaded shaft 30 and platform 40 are re-engaged with the base 20 to subsequently support the load 16.

While a particular form of the invention has been illustrated and described, it will be apparent that various modifications can be made without departing from the spirit and scope of the invention. For example, the lower base 70 may include, instead of a plurality of radially-extending feet 90, a circular base (not shown). Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A stand for supporting a load on a support surface, comprising:
    a base adapted for resting on a support surface;
    a threaded shaft having a platform at a top end thereof;
    an upper base configured for receiving a portion of the threaded shaft therein through an open top end thereof; and
    a manually-actuable knob engaging the threaded shaft to raise or lower the shaft, platform, and the load with respect to the base;
    wherein the threaded shaft includes a notch formed in each thread at a first radial location about the threaded shaft, each notch aligned with the adjacent notches, the upper base including a tab projecting inwardly from an inside surface thereof, the tab configured to engage at least one of the notches of the threads as the threaded shaft moves up and down within the upper base, the tab of the upper base, being positioned in at least one of the notches, prevents relative rotation between the upper base and the threaded shaft and the threaded shaft and platform maintaining the same rotational position therealong;
    the knob including an outer surface adapted for manual gripping, a lower collar adapted to cover the open top end of the upper base and rotate thereon, and an inner thread configured for engaging the threaded shaft.

2. The stand of claim 1 wherein the platform has a planar upper surface and a radial cut-out extends from an outer periphery of the platform toward a central portion thereof.

3. The stand of claim 1 wherein the threaded shaft includes a thread with at least six starts and the knob includes threads engaging one of the at least six starts of the threaded shaft.

4. The stand of claim 1 wherein the platform is removably attached with a top end of the threaded shaft with a mechanical fastener.

5. The stand of claim 1 wherein the threaded shaft includes a thread with at least eight starts.

6. The stand of claim 1 wherein the base comprises an upper base configured for receiving a portion of the threaded shaft therein through an open top end thereof, a lower base comprising a central receiver and plurality of feet radially extending therefrom and each adapted for contacting the support surface, and the central receiver is configured for receiving a lower end of the upper base in a substantially vertical orientation.

7. The stand of claim 6 wherein an end portion of each foot includes an aperture.

8. The stand of claim 1 wherein the load is a garbage disposal machine, whereby a power cord of the garbage disposal machine is not pinched between the platform and the garbage disposal machine when the power cord is positioned in the cut-out of the platform.

9. The stand of claim 1 further including an alignment tool for aligning a split retainer ring for receipt in an exterior ring groove formed around the exterior of a lower peripheral of a sink drain fitting, the alignment tool comprising:
   a tubular segment defined by a peripheral wall enclosing an interior opening dimensioned to radially compress the retainer ring upon transverse receipt thereof within the opening, a first portion of the peripheral wall including a plurality of spaced separations extending parallel to the central axis of the segment defining a corresponding plurality of partial wall strips extending in cantilever from the remaining second portion thereof to top ends thereof;
   a support shoulder formed in interior surfaces of each strip at the top ends thereof for opposing the axial translation of the ring within the interior opening; and
   a bottom plate extending across the second portion of the tubular segment at a bottom end thereof, the bottom plate including a central threaded aperture therethrough for receiving the threaded shaft;
   the platform including a lower surface adapted for fitting above sink drain with the threaded shaft extending through the sink drain fitting;
   whereby with the platform fitted above the sink drain with the threaded shaft extending through the sink drain fitting and threaded onto the central threaded aperture of the bottom plate of the alignment tool, and with the split ring fixed within the opening at the top ends of the strips at the support shoulders thereof, the split ring is pressed about the lower peripheral of the sink drain fitting by rotating the alignment tool, flexing each strip outwardly as the split ring expands around the lower peripheral of the sink drain fitting until it snaps into the ring groove of the sink drain fitting.

10. The stand of claim 9 wherein the alignment tool includes a plurality of outwardly-projecting prongs configured for facilitating a manual grip on the alignment tool for threading the alignment tool onto the threaded shaft.

* * * * *